(12) United States Patent
Lowney et al.

(10) Patent No.: US 11,477,223 B2
(45) Date of Patent: Oct. 18, 2022

(54) SYSTEMS AND METHODS FOR ANALYZING CYBERSECURITY EVENTS

(71) Applicant: IronNet Cybersecurity, Inc., Fulton, MD (US)

(72) Inventors: Michael Lowney, Arlington, VA (US); Phillip Baker Schafer, Columbia, MD (US); Alexander Michael Conn, Arlington, VA (US); Patrick Collard, Arlington, VA (US); Stephen Kinser, Arlington, VA (US)

(73) Assignee: IronNet Cybersecurity, Inc., McLean, VA (US)

( * ) Notice: Subject to any disclaimer, the term of this patent is extended or adjusted under 35 U.S.C. 154(b) by 269 days.

(21) Appl. No.: 16/742,975

(22) Filed: Jan. 15, 2020

(65) Prior Publication Data
US 2021/0218764 A1 Jul. 15, 2021

(51) Int. Cl.
*H04L 29/06* (2006.01)
*H04L 9/40* (2022.01)
(52) U.S. Cl.
CPC ................. *H04L 63/1425* (2013.01)
(58) Field of Classification Search
CPC ........ H04L 63/1425; H04L 63/1416; G06F 21/554
See application file for complete search history.

(56) References Cited

U.S. PATENT DOCUMENTS

| | | | |
|---|---|---|---|
| 10,491,453 B2* | 11/2019 | Stern | H04L 67/75 |
| 2004/0260947 A1* | 12/2004 | Brady | H04L 63/1425 726/23 |
| 2009/0234784 A1* | 9/2009 | Buriano | G06F 16/437 707/999.005 |
| 2010/0050260 A1* | 2/2010 | Nakakoji | H04L 63/0227 726/23 |
| 2015/0067852 A1* | 3/2015 | Cher | G06F 21/554 726/23 |
| 2017/0373950 A1* | 12/2017 | Szilagyi | H04L 43/091 |
| 2018/0367553 A1* | 12/2018 | Hayden | G06F 21/552 |
| 2019/0354457 A1* | 11/2019 | Urmanov | H04L 63/1425 |
| 2020/0089877 A1* | 3/2020 | Kamiya | G06F 21/552 |
| 2020/0106797 A1* | 4/2020 | Christian | H04L 63/1425 |
| 2020/0314127 A1* | 10/2020 | Wilson | H04L 41/142 |
| 2021/0044563 A1* | 2/2021 | Reyes | H04L 63/0236 |

* cited by examiner

*Primary Examiner* — Joseph P Hirl
*Assistant Examiner* — Ka Shan Choy
(74) *Attorney, Agent, or Firm* — Fitch, Even, Tabin & Flannery LLP

(57) ABSTRACT

Methods and systems for the detection, identification, analysis of cybersecurity events in order to support prevention of the persistence of threats, malware or other harmful events are provided. The methods and systems of the present invention enable a user to find similar anomalous network traffic within a single network or across multiple networks. The methods and systems identify and correlate activity in order to analyze potential threats within a network by providing broader contextual information about how those threats relate to other activity within the network or across a sector or country.

14 Claims, 3 Drawing Sheets

SYSTEMS AND METHODS FOR ANALYZING CYBERSECURITY EVENTS

FIELD OF THE DISCLOSURE

The present disclosure relates to providing systems and methods for detecting network traffic behaviors in real time. More particularly, the disclosure relates to systems and methods for providing enhanced cybersecurity analysis by collecting and correlating network traffic data from one or more networks.

BACKGROUND OF THE DISCLOSURE

Known cybersecurity systems commonly analyze activity in a computer network representing suspicious or potentially malicious occurrences. Analytical techniques such as detecting signatures of known cyber threats or retrieving predictions from an analytic model are common. Behavioral models are a subset of analytic models that identify activity associated with known tactics, techniques, and procedures of cyber attackers. A common problem with these approaches is that they do not perfectly distinguish cyber threats that require action and remediation from other benign activity within a network.

Determining the root cause of detected events can require data gathering and forensic investigation that is prohibitively costly at scale. In the case of behavioral detection, analysts often lack sufficient information about whether observed behaviors are simply unusual for their environments or are otherwise associated with broader malicious campaigns affecting the community at large.

Current systems for sharing threat intelligence that focus on signatures of known malware are easily subverted by sophisticated attackers. These systems operate by computer security experts sharing signatures to pass knowledge to each other about malware or malicious servers. These signatures can be used to update a "blacklist" of known bad domains or IP addresses. This information is easy to share and makes it simple to check if a computer may have been compromised. While these checks may be simple to perform, they are not exhaustive. Such traditional threat intelligence, e.g., domain names and IP addresses, tend to be easy for an attacker to change simply by registering multiple domain names, or by changing which machine the attack is coming from.

Another disadvantage of using traditional threat intelligence sharing is the need for active reporting, which also means that the time between when an incident occurs and when it is reported can be very long. For example, in known systems, an event within a network indicating that a system has been compromised can be shared only after the cyber threats are reported. These indicators require someone with cyber expertise to search for anything that may match the reported malicious behavior. As such, manual searching can be slow and expensive from a resource standpoint. Furthermore, only large enterprises that have employees with the proper skill set to ensure that an enterprise's networks are properly protected from malicious actors can afford or implement these traditional methods.

Thus, cost effective systems and methods that collect and analyze data from multiple networks and provide detection of similar network traffic behaviors, in real time, are desired.

BRIEF SUMMARY OF THE DISCLOSURE

Systems and methods for the detection, identification, and analysis of cybersecurity events in order to support prevention of the persistence of threats, malware or other harmful events are provided. In an embodiment, a method of analyzing cybersecurity events in at least one network environment comprises the steps of: receiving data originating from the at least one network; processing the received data to identify a plurality of events; analyzing the plurality of events to determine groups of correlated events based on a similarity metric; and creating a record of the correlated events.

In an embodiment, the data originates from two different networks within the at least one network environment. In an embodiment the data is one of metadata, packet capture, summary data, and log data. In an embodiment, the method further comprises the step of adding contextual data to one or more of the plurality of events describing the circumstances by which the event was produced. In an embodiment, the method further comprises generating a feature vector describing at least one of the plurality of events and its corresponding contextual data. In an embodiment, the method comprises the step of analyzing the plurality of events takes place remotely from the step of receiving the data. In an embodiment, the method further comprises the step of sending the correlated events to a monitoring system for analysis by a user. In an embodiment, the method further comprises the step of applying at least one of a tag and a rating along with each of the corresponding correlated events that produces an alert sent to the monitoring system. The steps may be stored on a non-transitory machine-readable medium for providing instructions to a processor to perform the steps. In an embodiment, the similarity metric is a mathematical measure between a feature vector of two of the plurality of events.

A cybersecurity system for analyzing events in a network environment is also provided. In an embodiment, the system comprises at least one analytic engine for processing network traffic data originating from the network environment to produce events; at least one correlation engine adapted and configured to receive events from the at least one analytic engine, determine groups of related events based on a similarity metric, and identify a trend of related events; and a storage unit for storing the related events. In an embodiment, the system further comprises an enrichment engine for adding contextual data to one or more of the plurality of events describing the circumstances by which the event was produced. In an embodiment, the correlation engine is further adapted and configured to generate a feature vector describing at least one of the plurality of events and its corresponding contextual data. In an embodiment, at least one correlation engine is located remotely from the at least one analytic engine. In an embodiment, the similarity metric is a mathematical measure between a feature vector of two of the related events.

A further embodiment of a cybersecurity system for monitoring a network environment is also provided. The system comprises: at least one analytic engine adapted and configured to process data to produce events; at least one correlation engine adapted and configured to receive events from the at least one analytic engine, determine groups of related events based on a similarity metric, and identify a trend of related events; and a storage unit for storing the related events, wherein the data originates from two networks within the at least one network environment. In an embodiment, the system further comprises an enrichment engine for adding contextual data to one or more of the plurality of events describing the circumstances by which the event was produced.

In an embodiment, the correlation engine is further adapted and configured to generate a feature vector describing at least one of the plurality of events and its corresponding contextual data. In an embodiment, the at least one correlation engine is located remotely from the at least one analytic engine. In an embodiment, the similarity metric is a mathematical measure between the feature vector of two of the related events.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components, as appropriate, and in which.

DETAILED DESCRIPTION OF THE DISCLOSURE

Figure 1:
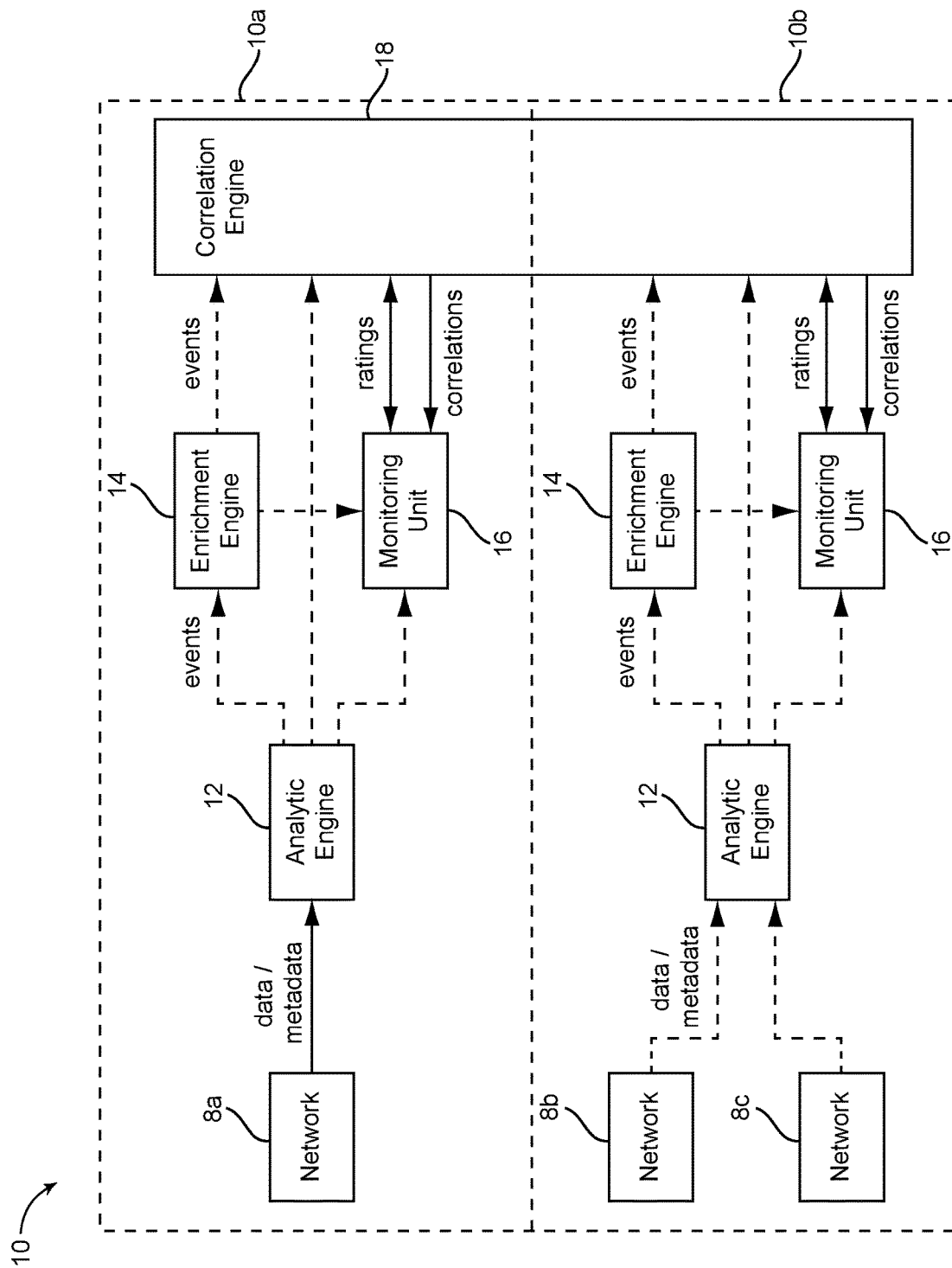
FIG. 1 is a block diagram of a cybersecurity system according to an embodiment of the present invention.

Systems and methods for the detection, identification, and analysis of cybersecurity events in order to support prevention of the persistence of threats, malware or other harmful events are provided. The systems and methods of the present invention also enable a user to find similar anomalous network traffic within a single network or across multiple networks. The embodiments herein identify correlated activity and can help analysts more quickly investigate potential threats within a network, by providing broader contextual information about how those threats relate to other activity within the network or across a sector or country. Furthermore, the embodiments provide a means by which analysts may share investigative outcomes and other information about the specific events that have been correlated. This shared information may help bring attention to events that appeared benign on their own, but that may also warrant further investigation and remediation when viewed within a broader context.

The methods and systems herein use analytic models to identify anomalous traffic using network traffic metadata. In some embodiments, the methods extract a feature set that describes the behavior of the network traffic. In some embodiments, a similarity or distance metric is defined that measures the similarity or dissimilarity of these feature sets. In some embodiments, data mining techniques are employed, such as locality sensitive hashing, which is applied to the behavior-based features to find pairs or groups of similar events which are considered correlated. Network events are thus analyzed to identify similar behaviors across the one or multiple networks. Data is shared in real time across networks to allow for collaboration and trend identification.

There are many benefits and advantages of the systems and methods of the embodiments of the present invention. Embodiments herein allow cybersecurity analysts to find similar traffic behaviors across multiple computer networks. These systems utilize data sharing data between networks sending that data to resources in the cloud. The system efficiently finds highly correlated traffic and alerts the user that these correlations exist. When an analyst examines a specific alert, they will be able to view a list of alerts that are considered correlated to the alert that exists on the network at their company or enterprise. Further, embodiments herein provide identification of a "trend" of correlated events, which can lead to more effective triage and prioritization of these events than would be possible by examining them individually. In addition, according to embodiments of the present invention, if one of a group of related events is found through human investigation to represent true malicious activity, the priority of the remaining events can be immediately elevated, allowing for rapid investigation and remediation across potentially multiple network environments. In addition, the methods and systems herein enable data to be shared in real time across networks to allow for collaboration and trend identification.

Cybersecurity System Components

FIG. 1 is a block diagram of an embodiment of a cybersecurity system according to the present invention. For exemplary purposes, the system 10 is illustrated as an aggregate of two sub-systems 10a and 10b having corresponding networks 8a and 8b-8c, respectively. In subsystem 10a, data and/or metadata related to cybersecurity events originates from one network than one network, whereas subsystem 10b shows data originating from multiple networks 8b and 8c. The systems and methods of the present invention may be implemented in either subsystem context or both, as provided in the exemplary system 10 of FIG. 1.

As illustrated in FIG. 1, one or more analytic engines 12 process data or metadata originating from one or more networks 8a-8c, also known as networks environments. The network may be, for example, a physical computer network, a virtual network such as a cloud network, or a hybrid network, or combination thereof. The data is fed into the analytic engine 12, and may consist of, for example, packet capture, summary data (such as Cisco Netflow or other proprietary formats), log data (Zeek or endpoint logs), or others. The analytic engine 12 may be physically co-located within the networks 8a-c or may be physically remote, such as in a cloud or virtual environment. The analytic engine 12 may also consist of a single computer, a cluster of computers, or a distributed computational system.

Based on the data received from one or a plurality of the networks 8a-c, the corresponding analytic engine 12 produces events or data records that represent the occurrence of certain types of activity of interest. The events may represent activity matching a fixed or predetermined rule set (e.g., malware signatures); anomalous activity in comparison to a model of "normal" network activity; suspicious or noteworthy behaviors according to one or more models or detection algorithms including behavioral models and behavioral detection algorithms. In one embodiment, the analytic engine(s) 12 processes data from the networks 8a-c of a large number of enterprises within a commercial sector, geographical region, nation, or government.

After the data passes through the analytic engine 12 to produce an event, the event is transmitted to one or more of: an enrichment engine 14, a monitoring system 16, or directly to the correlation engine 18. For purposes of illustration, FIG. 1 illustrates that the events are passed to all three simultaneously. However, it is envisioned that one, two or three of these paths may occur in embodiments of the systems and methods herein. The data may also travel along these paths serially or simultaneously.

In an embodiment, the events pass through the enrichment engine 14, which adds additional contextual data describing the circumstances by which the event was produced. This may include: information about any rules or signatures responsible for producing the event; characteristics or statistics of the input data (e.g., network traffic data) that caused the event to be produced; IPs, hostnames, or domain names associated with the network traffic; additional predictions or outputs of the model or algorithms producing the event; or other relevant general characteristics of the respective network 8a-8c or input data.

In an embodiment, the contextual data added by the enrichment engine 14 is drawn from one or more data sources external to the analytic engine 12. This additional data may be queried from the data sources using existing contextual data for the event (e.g., domain registrar data may be looked up using domains associated with the event). FIG. 1 illustrates an embodiment in which the data is transmitted by the analytic engine 12 to the enrichment engine 14, which gathers the additional data and adds it to the event or event record. In other embodiments, the additional data may be gathered and added to the event by the analytic engine 12 itself. The additional data enrichment may include scoring or additional predictions by way of a scoring engine or other device (not shown), whether by applying rules to existing contextual data or by processing this existing contextual data with additional analytic models.

As described above, events are transmitted along one or more of three paths on its way to the correlation engine 18. These paths are either directly to the correlation engine 18 by the analytic engine 12, or through one or both of the enrichment engine 14 and monitoring unit 16. The monitoring unit 16 is a device or system that ultimately provides and displays correlated data information to an analyst or user at an enterprise. The correlation engine 18 is a computer or computational system. In some embodiments, the correlation engine 18 may be physically co-located with an analytic engine 12. In other embodiments, the correlation engine 18 may be physically remote from one or more of the analytic engines 12. The correlation engine 18 is configured to perform one or more operations or processes for finding pairs or groups of related events.

In one embodiment, the correlation engine 18 further processes the event to generate a feature vector, such as an array of numbers, letters, or symbols, describing the event and its optional contextual data. This feature vector may be further transformed by one or more mathematical operations to form a transformed feature vector. In other embodiments, the feature vector and transformed feature vector may be generated by other computational components, for example, by the analytic engine 12 or by a separate feature extraction engine (not shown) and then added to the event prior to the event being transmitted to the correlation engine 18.

The correlation engine 18 is equipped with a similarity (or distance) metric, which is a mathematical measure of the similarity (or dissimilarity) between two feature vectors. In some embodiments, a supervised or unsupervised learning algorithm may be used to tune parameters of the feature transformations and/or similarity metric. For example, a body of training data may be collected comprising a number of events representing behaviors of known malware examples. These events may be labeled by the known malware family of each malware example and used to train a distance metric by one of several supervised metric learning algorithms that are well known in the art. In some embodiments, this training data may be collected automatically by the monitoring unit 16.

The correlation engine 18 adds each incoming event, including its optional contextual data and/or feature vector, to one or more data stores using a data structure that enables efficient search for events whose feature vectors are similar according to the distance or similarity metric. In some embodiments, the data store could comprise a tree-based structure, such as K-D tree or ball tree, or a hash structure with hashes produced by locality sensitive hashing. In another embodiment, cluster centroids or other cluster parameters are stored, and the new incoming event is used to update these clustering parameters, either in online fashion, or by storing the event along with others and updating the cluster parameters in batches. For each new event arriving at the correlation engine 18, the correlation engine 18 searches its data store for one or more other, similar events.

According to embodiments of the present invention, two events may be defined as correlated in a number of ways. For example, in one embodiment, a threshold may be defined or predetermined by a user such that two events are said to be correlated if the similarity or distance metric with the new event falls above or below the threshold. In yet another embodiment, the incoming event can be assigned to a cluster, and said to be correlated to all the other events in that cluster. Its similarity or distance from several clusters can also be evaluated and a threshold can be defined, where the event is said to be correlated with all the events in the cluster(s) whose similarity or distance falls above/below that threshold. Records of these correlations are stored by the correlation engine 18 for later use.

Once the correlations are determined by the correlation engine 18, information about each incoming event and its corresponding correlated events is transmitted back to the analytic engine 12 and/or to the monitoring unit 16 associated with the correlated events. This information can include any relevant contextual information, features, and identifiers. In some embodiments, events receive ratings, tags, comments, and other metadata from the analytic engine 12 or monitoring system 16, either algorithmically or by human interaction. These metadata may be transmitted to the correlation engine 18 and distributed to other analytic engines 12 or monitoring systems 16 associated with each event's correlated events. In yet another embodiment, ratings or tags that are applied to one or more of a group of correlated events may be used to produce alerts that are sent to the monitoring systems associated with other events in the group.

Cybersecurity Methods

Figure 2:
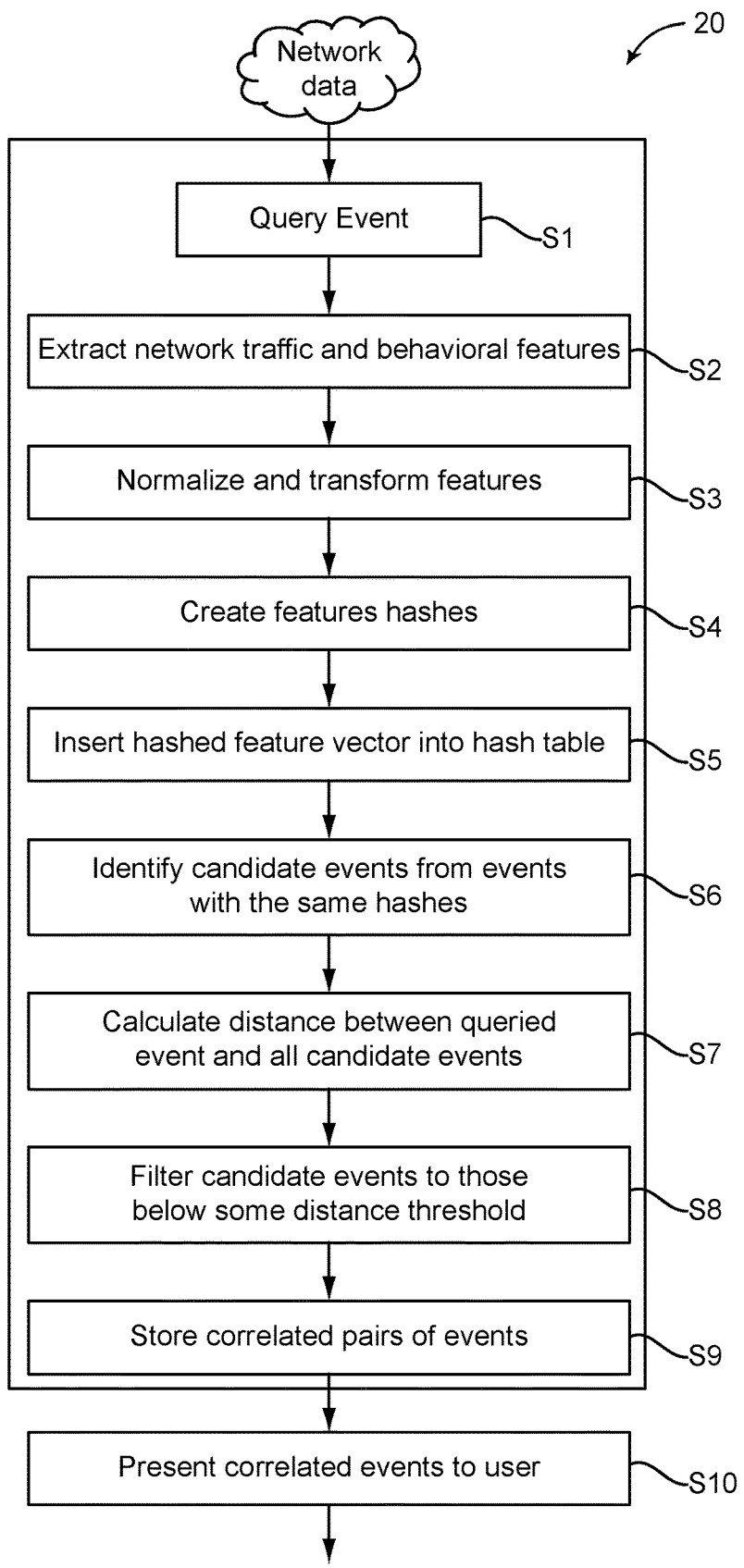
FIG. 2 is a flow chart of a method of analyzing cybersecurity events according to an embodiment of the present invention.

FIG. 2 is a flow chart of one embodiment of a method of analyzing cybersecurity events according to the present invention. The method 20 includes steps S1-S20. Events originating from data, such as network traffic data, are produced by the analytic engine 12. The events are queried at S1, and then the correlation engine 18 takes these events as input, performs a series of operations namely steps S2-S9, to identify like events, and stores pairings of like events for future use and display to users. At S2, network features and behavioral features are extracted. At S3, any number of relevant features of different feature types are normalized and transformed into a single representative feature type. At S4, the details of the event, both related to the behavioral activity of the event as well as the contextual information around the event, are used to create feature hashes. The feature vector is hashed using multiple hashing functions that preserve the locality of feature vectors. At S5, the event and its corresponding feature vector are inserted into a hash table. At S6, candidate correlated events are found by looking up events that have the same hash in the hash table. At S7, a distance measure is used to calculate a numeric distance between the feature vectors of the candidate events. Then at S8, candidate events within the hash table are filtered to those below a threshold distance to determine the correlated events. At S9, the pairings of events that meet the correlation criteria are stored in a table for later access by users. Ultimately, at S10, the correlations are presented to user for each event in the monitoring system 16. This process is repeated for each event.

Cybersecurty System Network Architecture

Figure 3:
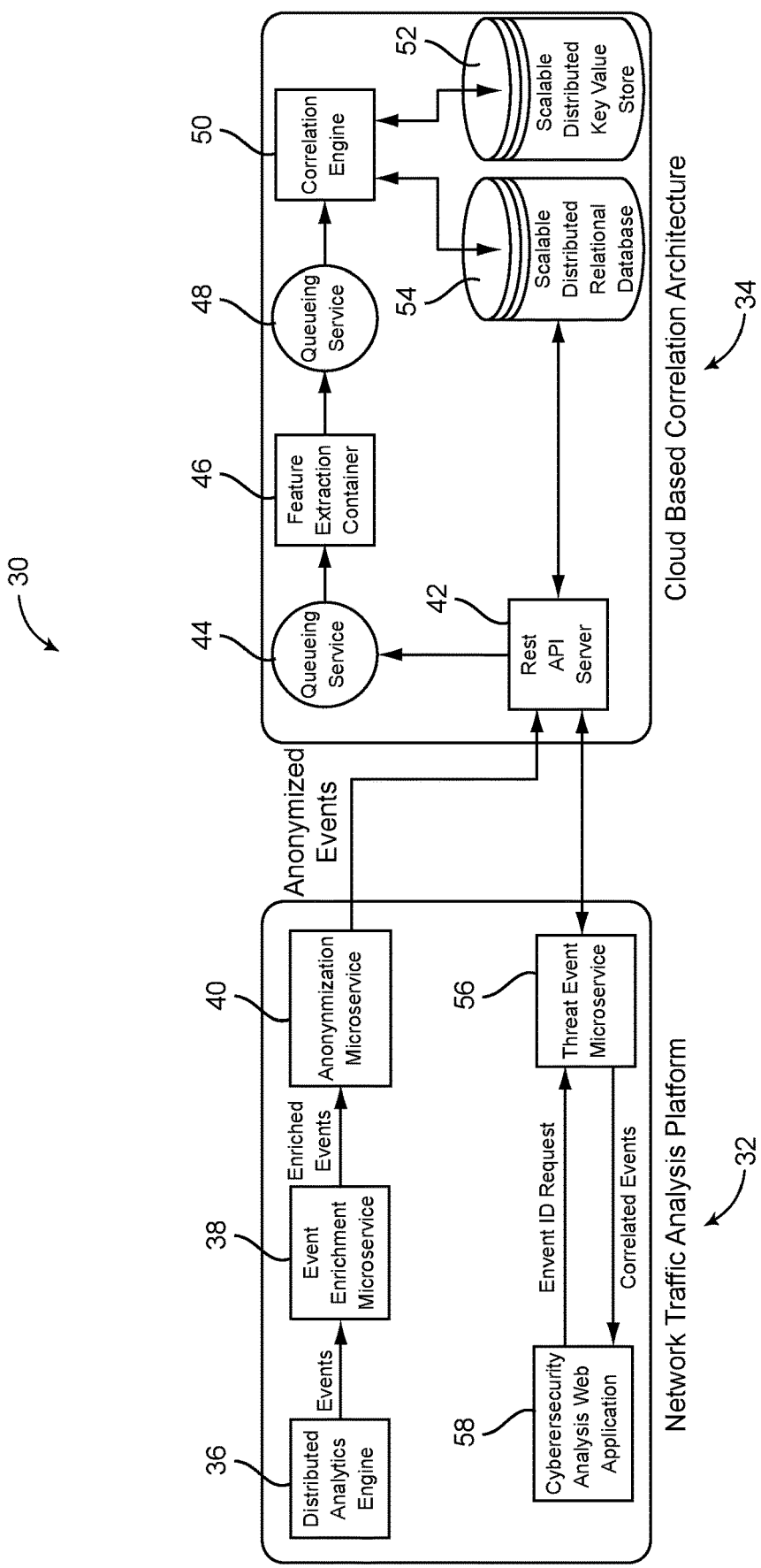
FIG. 3 is a diagram of how data travels through a network traffic analysis platform in communication with a cloud-based data architecture according to an embodiment of the present invention.

FIG. 3 is a diagram of data travelling through a network architecture according to embodiments of the systems and methods of the present invention. The components provided in the diagram are connected to and in communication with the other components as indicated by the lines and arrows. The cybersecurity system 30 has a network traffic analysis platform 32, hereinafter analysis platform 32, connected to a behavioral correlation platform 34, according to an exemplary embodiment of the present invention. While only one analysis platform 32 is illustrated in FIG. 4, embodiments of the present invention may include a plurality of analysis platforms 32 that all connect to a single behavioral correlation platform 34. The analysis platform(s) 32 and the behavioral correlation platform 34 may communicate and/or connect through the same REST API server 42. The platform 32 contains a distributed analytics engine 36. In the embodiment illustrated in FIG. 4, the distributed analytics engine 36 may be, for example, a multi-node analytics module such as an Apache Spark™ cluster. The distributed analytics engine 36 performs distributed computing, and in an embodiment, a number of Apache Spark™ applications as well, that provide network detection analytics that produce events in the system 30.

When events are processed in the system 30, they are consumed by an event enrichment microservice 38 that performs a number of enrichments on the domains, such as looking up additional information about domains that are used. After the events are enriched by the event enrichment microservice 38, they are provided to an anonymization microservice 40 that anonymizes the events by removing specific and sensitive data, such as company, entity or enterprise data. This step prevents users from one company from identifying the source of an event from another company or entity. Events are then sent via a REST API server 42 to the behavioral correlation platform 34, or, cloud-based correlation architecture, such as one provided on Amazon AWS. From the REST API server 42, events are then placed into a queue 44. In an embodiment, AWS SQS is used for performing the queuing service.

A feature extraction container 46 consumes events from the queue 44 and performs the feature extraction, normalization, and the feature hashing steps. Then, the event, with its corresponding feature vectors and hashes, are placed into another queue 48. A correlation engine 50 consumes this data and performs the correlations of events, which includes reading and writing data to one or two separate databases, as discussed above. These two databases may include: 1) a scalable distributed key value store 52, such as a Redis key value store, which is used to store the events and their hashes; and 2) a scalable distributed relational database 54, or RDS database 54 such as PostgreSQL, that contains the correlated event data.

In order to retrieve and present the correlated event data, the monitoring system 58 requests data from a threat event microservice 56, which queries the correlation REST API server 42. The monitoring system 58 may use a number of APIs to get data from that stack as well as to get data from the behavioral correlation platform 34. Correlated events are returned from the RDS database 54, then through the threat event microservice 56, which are ultimately provided and displayed to an analyst or user via the monitoring system 58.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method of analyzing cybersecurity events in at least one network environment in real time comprising the steps of:
   receiving, in real time, data originating from the at least one network;
   processing, in real time, the received data;
   producing a plurality of events in response to the processing;
   adding, in real time, contextual data to one or more of the plurality of events describing the circumstances by which the event was produced;
   generating, in real time, a feature vector for each event for which contextual data was added, wherein the feature vector describes the event and the contextual data of that event;
   determining a similarity metric for each pair of the plurality of events, wherein each similarity metric is a mathematical measure between the feature vectors of that pair;
   determining at least one group of correlated events based on comparisons of similarity metrics; and
   creating, in real time, a record of the at least one group of correlated events in a data store, wherein efficient search within the at least one data store for events with similar feature vectors is enabled.

2. The method of claim 1, wherein the data originates from two different networks within the at least one network environment.

3. The method of claim 1, wherein the data is one of metadata, packet capture, summary data, and log data.

4. The method of claim 1, wherein each feature vector comprises an array including at least one of numbers, letters, and symbols.

5. The method of claim 1, wherein the step of determining at least one group of correlated events takes place remotely from the step of receiving the data.

6. The method of claim 1, further comprising the step of sending at least one group of correlated events to a monitoring system for analysis by a user.

7. The method of claim 6, further comprising the step of applying at least one of a tag and a rating along with each of the correlated events of at least one group of correlated events that produces an alert sent to the monitoring system.

8. The method of claim 1, wherein the steps are stored on a non-transitory machine-readable medium for providing instructions to a processor to perform the steps.

9. A cybersecurity system for analyzing events in a network environment, the system comprising:
   at least one computing device comprising a processor and non-transitory memory;
   at least one analytic engine, configured to run on at least one of the at least one computing device, for real time processing of network traffic data originating from the network environment to produce events;
   at least one correlation engine, configured to run on at least one of the at least one computing device, adapted and configured to receive a plurality of events in real time from the at least one analytic engine, and determine, in real time, groups of related correlated events based on a similarity metric;
   an enrichment engine, configured to run on at least one of the at least one computing device, for adding, in real time, contextual data to one or more of the plurality of events describing the circumstances by which the event was produced, wherein the at least one correlation engine is further adapted and configured to:
   generate, in real time, a feature vector for each event for which contextual data was added, wherein the feature vector describes the event and the contextual data of that event,
   determine the similarity metric for each pair of the plurality of events, wherein each similarity metric is a mathematical measure between the feature vectors of that pair, and
   determine at least one group of correlated events based on comparisons of similarity metrics; and
   a data store stored on non-transitory memory for storing the at least one group of correlated events, wherein efficient search within the at least one data store for events with similar feature vectors is enabled.

10. The system of claim 9, wherein each feature vector describing at least one of the plurality of events and its corresponding contextual data comprises an array including at least one of numbers, letters, and symbols.

11. The system of claim 9, wherein the at least one correlation engine is located remotely from the at least one analytic engine.

12. A cybersecurity system for monitoring a network environment, the system comprising:

at least one computing device comprising a processor and non-transitory memory;

at least one analytic engine, configured to run on at least one of the at least one computing device, adapted and configured to process data in real time to produce events;

at least one correlation engine, configured to run on at least one of the at least one computing device, adapted and configured to receive a plurality of events in real time from the at least one analytic engine, and determine, in real time, groups of related correlated events based on a similarity metric;

an enrichment engine, configured to run on at least one of the at least one computing device, for adding, in real time, contextual data to one or more of the plurality of events describing the circumstances by which the event was produced, wherein the at least one correlation engine is further adapted and configured to:

generate, in real time, a feature vector for each event for which contextual data was added, wherein the feature vector describes the event and the contextual data of that event, determine the similarity metric for each pair of the plurality of events, wherein each similarity metric is a mathematical measure between the feature vectors of that pair, and determine at least one group of correlated events based on comparisons of similarity metrics; and a data store stored on non-transitory memory for storing the at least one group of correlated events, wherein efficient search within the at least one data store for events with similar feature vectors is enabled, wherein the data originates from two networks within the at least one network environment.

13. The system of claim 12, wherein each feature vector describing at least one of the plurality of events and its corresponding contextual data comprises an array including at least one of numbers, letters, and symbols.

14. The system of claim 12, wherein the at least one correlation engine is located remotely from the at least one analytic engine.

* * * * *